Sept. 8, 1959  A. R. LOSSIUS  2,902,793
FLY SWATTER HAVING FLY PICK UP
Filed June 18, 1956  2 Sheets-Sheet 1
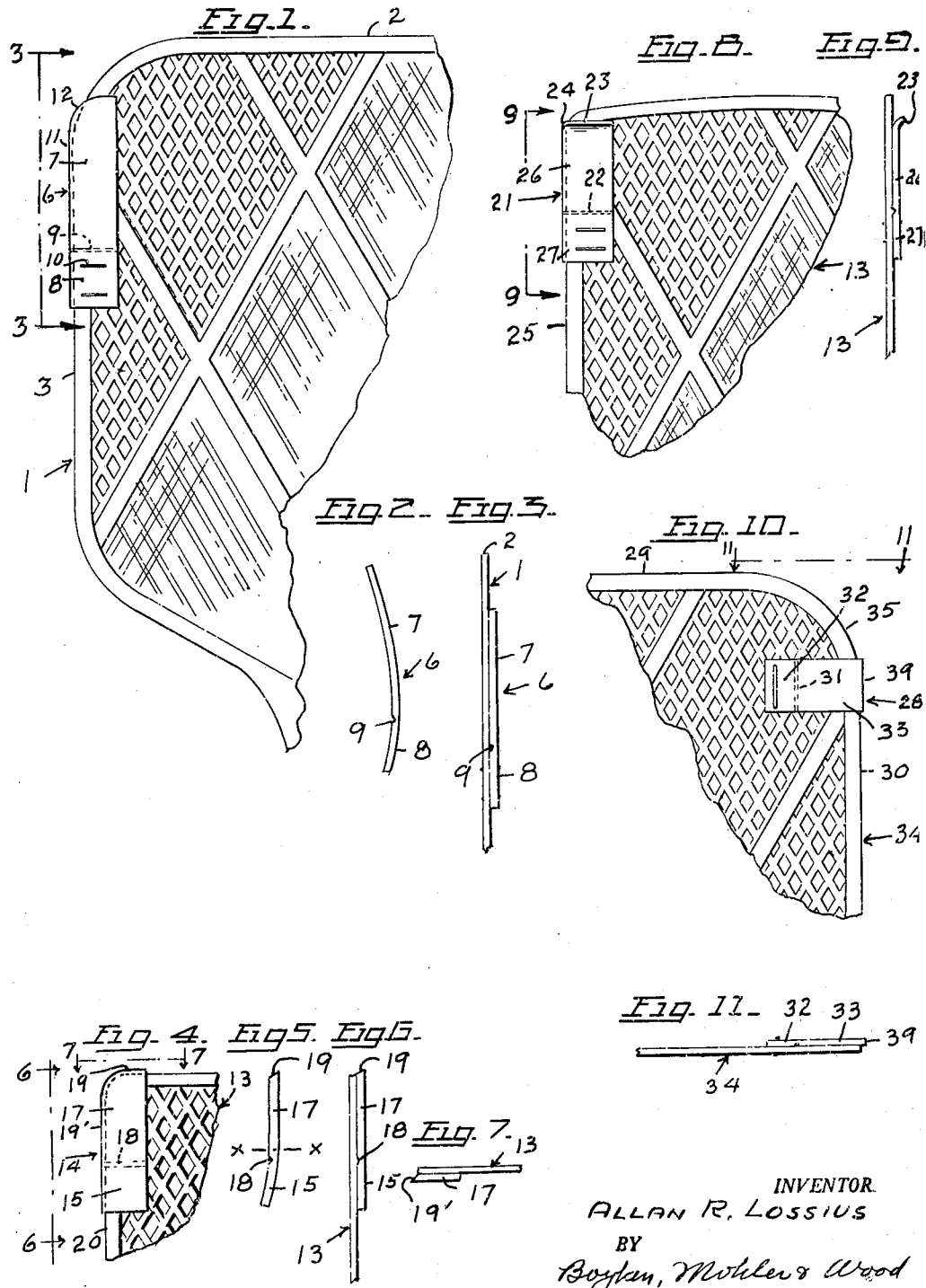
INVENTOR.
ALLAN R. LOSSIUS
BY
Boylan, Mohler & Wood
ATTORNEYS Sept. 8, 1959  A. R. LOSSIUS  2,902,793
FLY SWATTER HAVING FLY PICK UP
Filed June 18, 1956  2 Sheets-Sheet 2
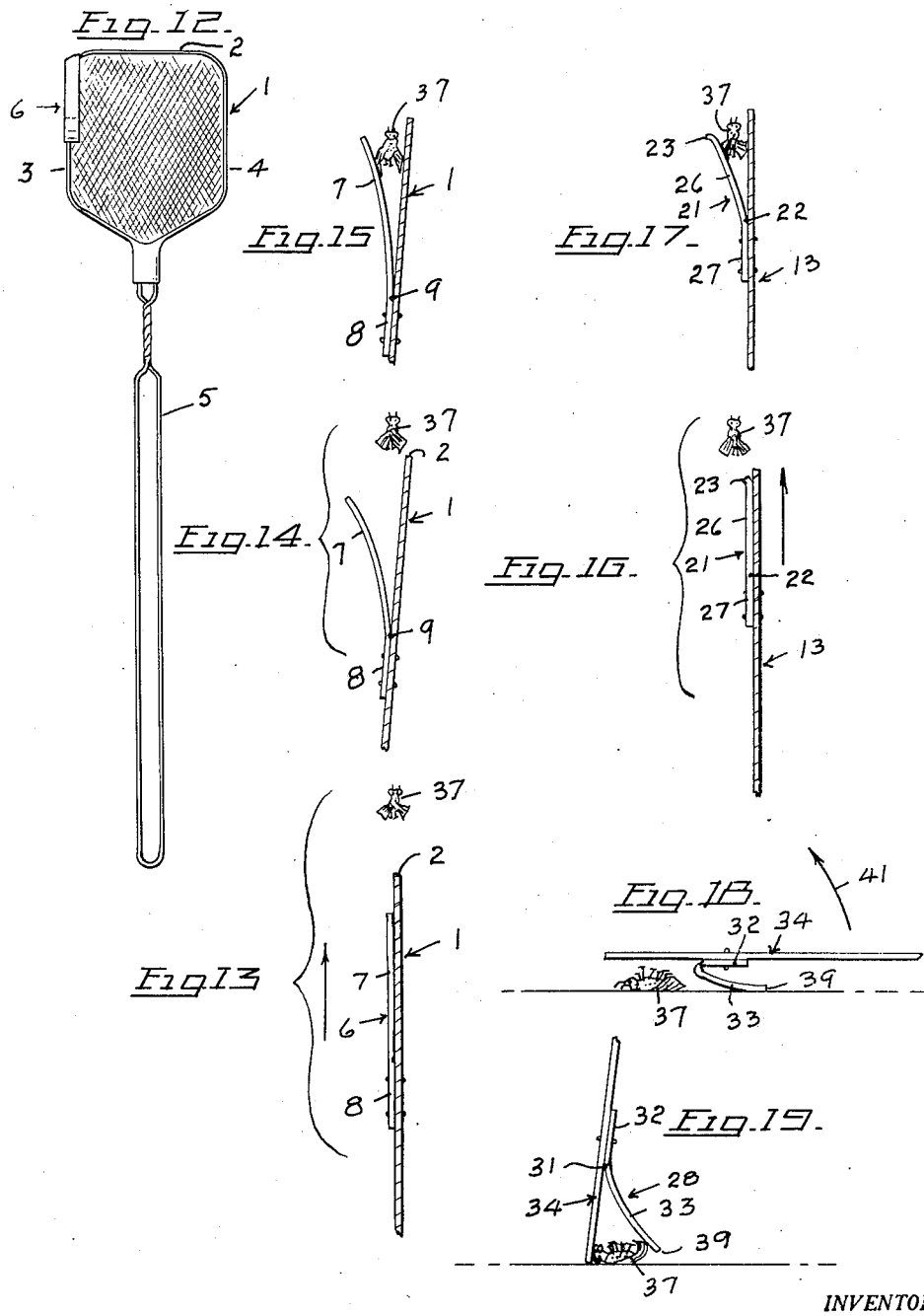
INVENTOR.
ALLAN R. LOSSIUS
BY
Boyken, Mohler & Wood
ATTORNEYS

United States Patent Office 2,902,793
Patented Sept. 8, 1959.

2,902,793

FLY SWATTER HAVING FLY PICK UP

Allan R. Lossius, San Francisco, Calif.

Application June 18, 1956, Serial No. 592,031

4 Claims. (Cl. 43—137)

This invention relates to fly swatters generally, and more specifically to a fly swatter having a fly pick up device that enables an operator to quickly and easily pick up a fly from the surface on which it has fallen without the use of other aid than that of the fly swatter itself.

One of the objects of the invention is the provision of simple means on a fly swatter of conventional structure for picking up a fallen fly, and which means is adapted to be efficiently used by any skilled or unskilled person and does not interfere with the efficiency of the fly swatter when the latter is being used to kill the fly.

Another object of the invention is the provision of a fly pick up device on a fly swatter of conventional outline, that is cheap to make, and that is adapted to quickly pick up flies or other insects of different sizes, from very small ones to those that are quite large in size, and which device will readily release such flies or insects by a slight shake of the fly swatter.

A still further object of the invention is the provision of a fly pick up device in a fly swatter, that employs a pair of yieldable opposed jaws or clamping elements between which the fly or insect is yieldably held, and one of which jaws or elements is a portion of the fly swatter.

An added object of the invention is a fly pick up device that is adapted to yieldably engage and hold a fly or other insect without squashing the same, thus keeping the device relatively clean, and also facilitating the release of the fly or insect from the device.

Prior devices have been associated with fly swatters for use in picking up flies and the like, but they have been objectionable for many reasons, several being that they have been either wholly disposed beyond the projected confines of the outline of the fly swatter, or they have been incapable of picking up flies below a certain size, or else they have so firmly gripped the flies that the latter have been squashed or have been difficult to remove from the pick up device. If the pick up device is outside the confines of the fly swatter, it restricts the operation of the swatter in many instances, for the latter cannot reach the fly, and also the device is easily damaged or broken off. Furthermore, any substantial projection on a fly swatter results in increased noise in using it, and in many instances the fly will be forewarned in time to escape.

The objection to a device that cannot pick up small flies, or that can only pick them up with great difficulty, or to a device that will squash the flies, is obvious.

The present invention overcomes the objections above mentioned, and other objects and advantages will appear in the description and in the drawings.

In the drawings, Fig. 1 is an enlarged fragmentary view of a portion of the head of a conventional fly swatter showing one form of the invention as applied thereto.

Fig. 2 is an edge view of the fly pick up strip that is on the swatter of Fig. 1 before it has been secured to said swatter.

Fig. 3 is an edge elevational view of the invention shown in Fig. 1 as seen from line 3—3 of Fig. 1.

Fig. 4 is a fragmentary view similar to that of Fig. 1 showing a preferred form of the invention, differing slightly from that of Fig. 1.

Fig. 5 is a view similar to that of Fig. 2 showing the fly pick up device of Fig. 4 before it is on the swatter.

Fig. 6 is an edge view of the swatter of Fig. 4 as seen from line 6—6 of Fig. 4.

Fig. 7 is an edge view of the swatter of Fig. 4 as seen from line 7—7 of Fig. 4.

Fig. 8 is a fragmentary elevational view similar to that of Fig. 1 showing a slightly different form of the invention.

Fig. 9 is an edge view of Fig. 8 as seen from line 9—9 of Fig. 8.

Fig. 10 is a fragmentary elevational view similar to Fig. 8, but showing a different form of the invention.

Fig. 11 is an edge view of Fig. 10 as seen from line 11—11 thereof.

Fig. 12 is an elevational view of an entire swatter of generally the form shown in Figs. 1 to 10, but with a woven wire or screen head.

Figs. 13, 14, 15 are part sectional views showing the several steps in picking up a fly from a supporting surface with a device similar to that shown in Figs. 1, 4.

Figs. 16, 17 show successive steps in picking up a fly with structure shown in Figs. 4 or 8, the device illustrated being that of Fig. 8.

Figs. 18, 19 show several steps in picking up a fly using the structure shown in Fig. 10.

In detail, referring to Fig. 12, the fly swatter may comprise a flat, flexible head generally designated 1, which may be entirely of plastic material or of woven screen with a marginal binding strip. These are conventional structures, and each head has an outer end edge 2 and a pair of side edges 3, 4 extending from the ends of the end edge in a direction generally toward the handle 5. The latter is elongated and extends from the edge of the head that is opposite to the end edge 2.

In Figs. 1 and 12 the pick up device is shown as a strip 6 of flexible material such as rubber or of a plastic material having substantially the same characteristics of rubber. Thus the term "rubber" as used hereinafter and in the claims is intended to include any suitable plastic material having the characteristics of rubber.

This strip 6 has a relatively long end portion 7 and a relatively short end portion 8, and preferably, a groove or score 9 may extend transversely thereacross to provide a line of weakness along which most of the flexing will occur, said groove being at the juncture between the said end portions 7, 8.

The strip 6 is also preferably pre-bowed lengthwise, as seen in Fig. 2, which bowing may occur in manufacture by extruding a larger strip with the bow disposed transversely thereof, and then cutting the said strip transversely into sections, each of which sections correspond to a strip 6, and is bowed lengthwise.

The end portion 8 of strip 6 is secured against a marginal section of the head 1 alongside edge 3 with the strip 6 extending longitudinally of said edge 3, and with the end portion adjacent to the end edge 2. Staples 10 or any other suitable means may be employed to secure said strip to said marginal section, and when it is so secured the strip is flat against said marginal section and is under yieldable tension since it tends to resume its bowed condition, but is held substantially straight by the marginal section of the head.

The edge 11 of at least the outer end of end portion 7 projects slightly past the edge 3 so as to be outside the projected confines of the outline of the head 1, and the outer end edge 12 of the strip 6 is curved to generally follow the curvature of the corner of the head 1 at the juncture between edges 2, 3 thereof, although the portion 7 may terminate short of the end edge 2. While the groove 9 may be on either or both sides of strip 6, a slightly better action appears to be produced by forming it on the side of the latter that is next to the head 1.

In the form of pick up device illustrated in Figs. 4, 5 and 6, the fly swatter head is designated 13, and is of a contour conforming to that of Fig. 8 in which the corner of the head is more nearly square than in the form shown in Fig. 1.

In Fig. 4 the pick up device is a strip 14 that substantially conforms in outline to strip 6, having an end portion 15 that is adapted to be secured to a marginal section of the head 13 by staples or any other suitable means such as cement, and a longer end portion 17 that is free from such securement. This is the same arrangement as has been described for the fly pick up device of Fig. 1.

The strip 14 is preferably formed with a groove 18 that corresponds to groove 9, and that is for the same purpose, but strip 14 is preferably slightly thicker than strip 6 and the end portion 17 is bent to one side of the longer end portion 17, starting at the line x—x (Fig. 5) which is slightly past the groove 18 in direction toward the outer free end of portion 17.

It is to be noted that the terminating end edge 19 of strip 14, and the edge 19' that extends along the side edge 20 are bevelled so that the slanted side of the bevel generally faces to the side that is against the marginal section of the head. The strip is so positioned that the acute edge of the bevel projects outwardly of the projected confines of the outline of the head, as best seen in Figs. 6, 7.

When the end portion 15 of strip 14 is secured to the head, the end portion 17 that is free to flex, will lie flat against the marginal section of the head, and will be yieldably held thereagainst, because of its prestressing to a position in which the end portion 15 extends generally angularly relative to the longer end portion 17.

In the form of the invention shown in Fig. 8, the head 13 is illustrated as being of the same form and structure as the head 13 of Fig. 4. Strip 21 is of rubber or the like and is, preferably, also formed with a transversely extending groove 22, it being understood that in each of the forms illustrated, any desired weakening may be used along a line corresponding with the groove, provided adequate strength remains to properly hold the free end portion against the head, and to return it to said position when it is free from gripping a fly or the like between said end portion and the head.

In this form of the invention, the terminating end edge 23 is turned up or away from the swatter particularly at the corner 24 that projects beyond the adjacent side edge 25 of the fly swatter. The effect of this structure is similar to that of the bevelled edges of the strip 14 of Fig. 4. This turned up end is at the free end of the longer end portion 26 of the strip that is adapted to swing away from the swatter, while the shorter end portion 27 is suitably secured to the swatter by staples or cement, as desired. Preferably the longitudinally extending edge of the longer end portion 26 projects past the edge 25 of the head and said strip is normally bowed the same as at 15 in Fig. 5 before attaching it to the swatter.

In the form of invention as shown in Fig. 10, a strip 28 of rubber, similar to strip 26, is provided, except that the end is not turned up, and this strip is positioned so that it extends parallel with the end edge 29 of the fly swatter and angularly relative to the side edge 30 that is adjacent thereto. A groove 31 provides a line of weakness between the short end portion 32, which is stapled or cemented to the head 34 of the swatter, while the free longer end portion 34 extends to side edge 30 and slightly beyond said edge. The strip is preferably positioned so that it is substantially at the curved corner 35 of the head 34 that joins the edge 29 with edge 30.

In operation when a fallen fly 37 (Fig. 13) on the top surface of a table is to be picked up with the swatter 1, the latter is positioned substantially perpendicular to the table with the handle extending substantially horizontally but slightly inclined upwardly in direction away from head 1, and so that the edge 11 of end portion 7 of strip 6 engages the fly supporting surface at a side of the fly. The fly and the head 1 are substantially in the same vertical plane when in this position, and by moving the swatter forwardly with end edge 2 leading, and sliding the head 1 slightly to one side of the fly (Fig. 14) the end portion 7 of the strip 6 will flex along groove 9 and move away from head 1. Further forward movement will move the swatter to a position in which the fly is between the end portion 7 and the head 1, and then by slightly rocking the swatter head about edge 3 to release the frictional engagement between edge 11 of portion 7 and the table, the said portion will quickly move to grip the fly between it and the head 1 (Fig. 14). The fly may then be readily carried away for ejecting it outside the house or in a waste receptacle. By merely tapping the edge 3 of the swatter against a relatively solid object, the portion 7 will spring open to release the fly, or the fly can be readily freed by merely giving the swatter a shake.

In the swatter of Figs. 4 and 8, the mere engagement of the edge 19' (Fig. 4) or the corner 24 (Fig. 8) will swing the free end portion of the fly engaging strip in direction away from the swatter head, and the swatter may then be moved to a position such as shown in Fig. 17 without the necessity for applying any other than a straight forward movement of the swatter from the position shown in Fig. 16. Hence it will be seen that in the simplicity of operation, the forms shown in Figs. 4 and 8 are preferable to the other forms.

In the forms of swatters shown in Figs. 1, 4, 8 and 11, the fly clamping or engaging strips are along the near side of the swatter head, as seen in said figures, and along the left hand edge. This is because the swatter is normally held in the right hand and the fly and the fly pick-up structure can all be most easily observed up to and including the time the fly is picked up. Obviously, a similar strip could be positioned on the same side of the swatter head along the other side edge if desired, and which position might be more convenient for left handed persons, although no substantial difficulty is encountered when left handed persons use the pick-up device as illustrated in the drawings.

In the case of the device shown in Fig. 10, the strip is seen as being at the edge of the head that is opposite to the edge along which the strips are positioned in Figs. 1, 4 and 8. Here again, the strip 28 could be positioned along the other edge of the head, if desired.

In operating the device of Fig. 10, the projecting end edge 39 of strip 28 engages the table top or fly supporting surface at one side of the fly and then the head is swung to a horizontal elevated position in which it may be slid to a position over said fly (Fig. 18) being supported in said elevated position by the portion 33 of the pick-up strip. The head is then swung upwardly as indicated by arrow 41 (Fig. 18) to a position at the opposite side of fly 37 (Fig. 19) and the fly will be gripped between the swatter head and portion 33.

By the structure described, the strip that provides the one side of the pick-up device is considerably more flexible than the swatter head, which is quite important, since in operation only the strip will flex in direction away from the head in picking up a fly, which provides for accurate control and handling of the pick-up feature.

Also, it is pertinent to note that while the pick-up strip is grooved to provide a line of weakness for flexing of the free end portion of the strip, it is not absolutely essential that such groove or line of weakness be provided. However, by restricting the flexing of the pick-up strip substantially to the line along which the groove is positioned, the resistance to flexing is substantially the same at any degree of separation between the fly pick-up strip and the swatter head, which is a desirable feature since it prevents crushing a fly or insect, and enables the smallest of flies to be picked up with the same ease as the larger ones.

The bowing of the pick-up strip is not absolutely essential where the strip is cemented to the head, although it is desirable for insuring the return of the strip to engaging relation with the head after flexing of the strip. Some swatter heads tend to become deformed slightly, and where the pick-up strip is under a yieldable tension against the head, it will tend to follow deformations of the head.

It has already been mentioned that a fly will be released from the pick up device when the swatter is tapped on its edge. Actually, by the present structure the strip that is on the swatter will fly away from the swatter when the latter is tapped so there is no chance of the fly being squeezed between the strip and swatter.

I claim:

1. In a fly swatter having a substantially flat, flexible striking head and an elongated handle extending from one edge thereof, said head having an end edge opposite to said one edge terminating in opposite ends and a pair of substantially parallel side edges extending from said opposite ends of said end edge generally toward said one edge, a fly pick up device comprising a marginal section of said head along one side edge of said pair thereof adjacent to said end edge and a flexible strip of resilient material in face to face engaging relation to said marginal section secured at one end thereof to said section and having an end portion opposite to said one end thereof free from securement to said section, said strip having an edge on said last mentioned end portion accessible for frictional engagement with a flat supporting surface when said head is disposed substantially perpendicular to and over said surface to frictionally hold said strip for flexing of said end portion away from said marginal portion to a position with the fly to be picked up from such surface disposed between said end portion and said marginal section when said head is moved relative to said end portion to one side of such fly while said end portion is maintained in said frictional engagement with said surface at the other side of such fly, the edge of said end portion that is accessible for said engagement with such surface being at the terminating end of said end portion that is remote from the end that is secured to said marginal section and projecting slightly beyond the edge of said head along said marginal section.

2. In a fly swatter having a substantially flat, flexible striking head and an elongated handle extending from one edge thereof, said head having an end edge opposite to said one edge terminating in opposite ends and a pair of substantially parallel side edges extending from said opposite ends of said end edge generally toward said one edge, a fly pick up device comprising a marginal section of said head along one side edge of said pair thereof adjacent to said end edge and a flexible strip of resilient material in face to face engaging relation to said marginal section secured at one end thereof to said section and having an end portion opposite to said one end thereof free from securement to said section, said strip having an edge on said last mentioned end portion accessible for frictional engagement with a flat supporting surface when said head is disposed substantially perpendicular to and over said surface to frictionally hold said strip for flexing of said end portion away from said marginal portion to a position with the fly to be picked up from such surface disposed between said end portion and said marginal section when said head is moved relative to said end portion to one side of such fly while said end portion is maintained in said frictional engagement with said surface at the other side of such fly, said strip extending longitudinally of said one edge of said pair with its said end portion being adjacent to said end edge of said head, and said strip being weakened along a line extending transversely thereacross substantially at the juncture between the said end portion thereof and the end that is secured to said marginal section to substantially restrict the flexing of said strip to the part thereof at said line of weakness.

3. In a fly swatter having a substantially flat, flexible striking head and an elongated handle extending from one edge thereof, said head having an end edge opposite to said one edge terminating in opposite ends and a pair of substantially parallel side edges extending from said opposite ends of said end edge generally toward said one edge, a fly pick up device comprising a marginal section of said head along one side edge of said pair thereof adjacent to said end edge and a flexible strip of resilient material in face to face engaging relation to said marginal section secured at one end thereof to said section and having an end portion opposite to said one end thereof free from securement to said section, said strip having an edge on said last mentioned end portion accessible for frictional engagement with a flat supporting surface when said head is disposed substantially perpendicular to and over said surface to frictionally hold said strip for flexing of said end portion away from said marginal portion to a position with the fly to be picked up from such surface disposed between said end portion and said marginal section when said head is moved relative to said end portion to one side of such fly while said end portion is maintained in said frictional engagement with said surface at the other side of such fly, said strip extending longitudinally of said one side edge of said pair with its said end portion being adjacent to said end edge of said head, the part of said strip that is secured to and against said marginal portion exclusive of said end portion being pre-stressed for yieldably holding said end portion in engagement with said marginal section when said end portion is free from a force holding it away from said section.

4. In a fly swatter having a substantially flat, flexible striking head and an elongated handle extending from one edge thereof, said head having an end edge opposite to said one edge terminating in opposite ends and a pair of substantially parallel side edges extending from said opposite ends of said end edge generally toward said one edge, a fly pick up device comprising a marginal section of said head along one side edge of said pair thereof adjacent to said end edge and a flexible strip of resilient material in face to face engaging relation to said marginal section secured at one end thereof to said section and having an end portion opposite to said one end thereof free from securement to said section, said strip having an edge on said last mentioned end portion accessible for frictional engagement with a flat supporting surface when said head is disposed substantially perpendicular to and over said surface to frictionally hold said strip for flexing of said end portion away from said marginal portion to a position with the fly to be picked up from such surface disposed between said end portion and said marginal section when said head is moved relative to said end portion to one side of such fly while said end portion is maintained in said frictional engagement with said surface at the other side of such fly, the edge of said end portion that is accessible for said engagement with such surface being at the terminating end of said end portion that is remote from the end that is secured to said marginal section and projecting slightly beyond said one side edge of said pair thereof, the edge of said end portion projecting beyond said one side edge being bevelled on the side adjacent to said head whereby said end portion will tend to automatically flex in direction away from said section upon engagement between said bevelled edge and such surface.

References Cited in the file of this patent

UNITED STATES PATENTS

| 1,326,577 | Cullen | Dec. 30, 1919 |
| 2,624,149 | Atkinson | Jan. 6, 1953 |